INVENTOR.
PAUL GEYER

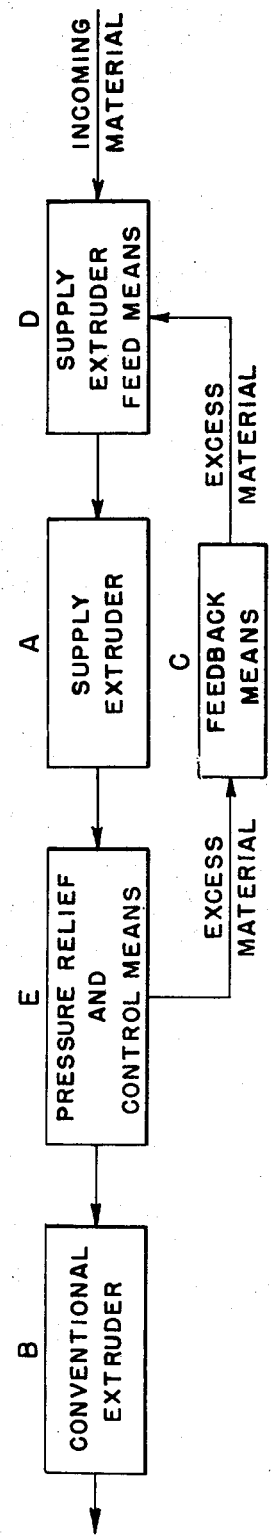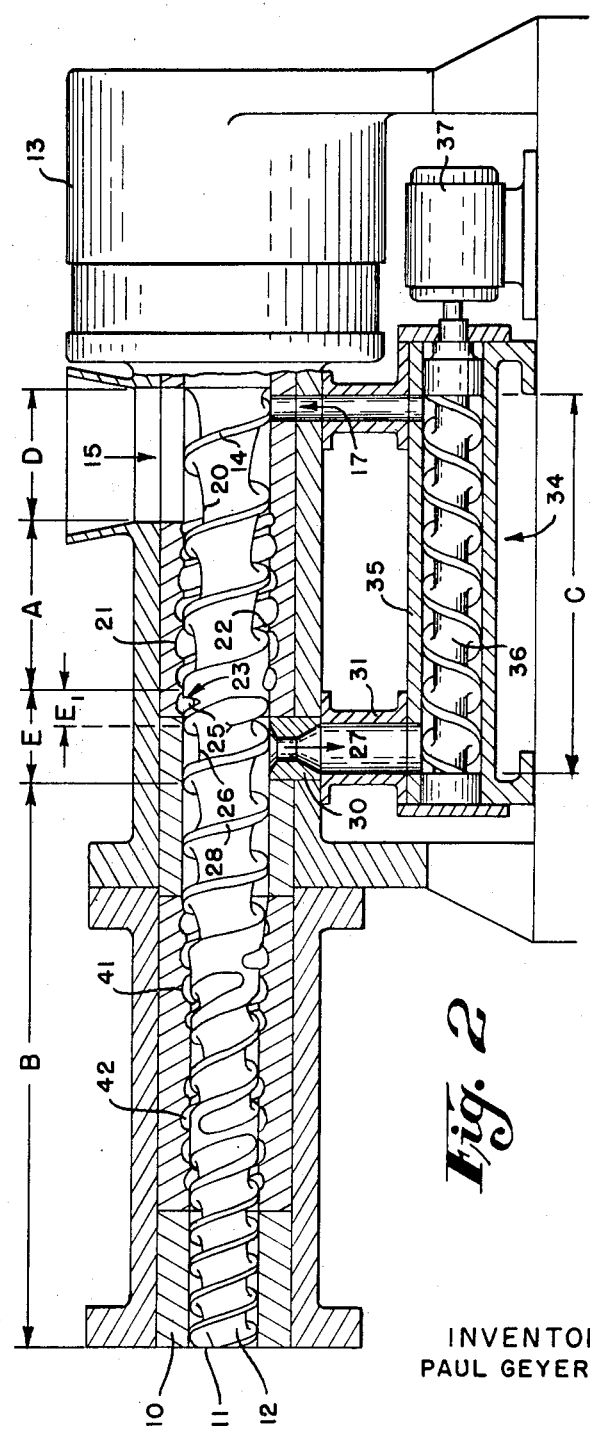

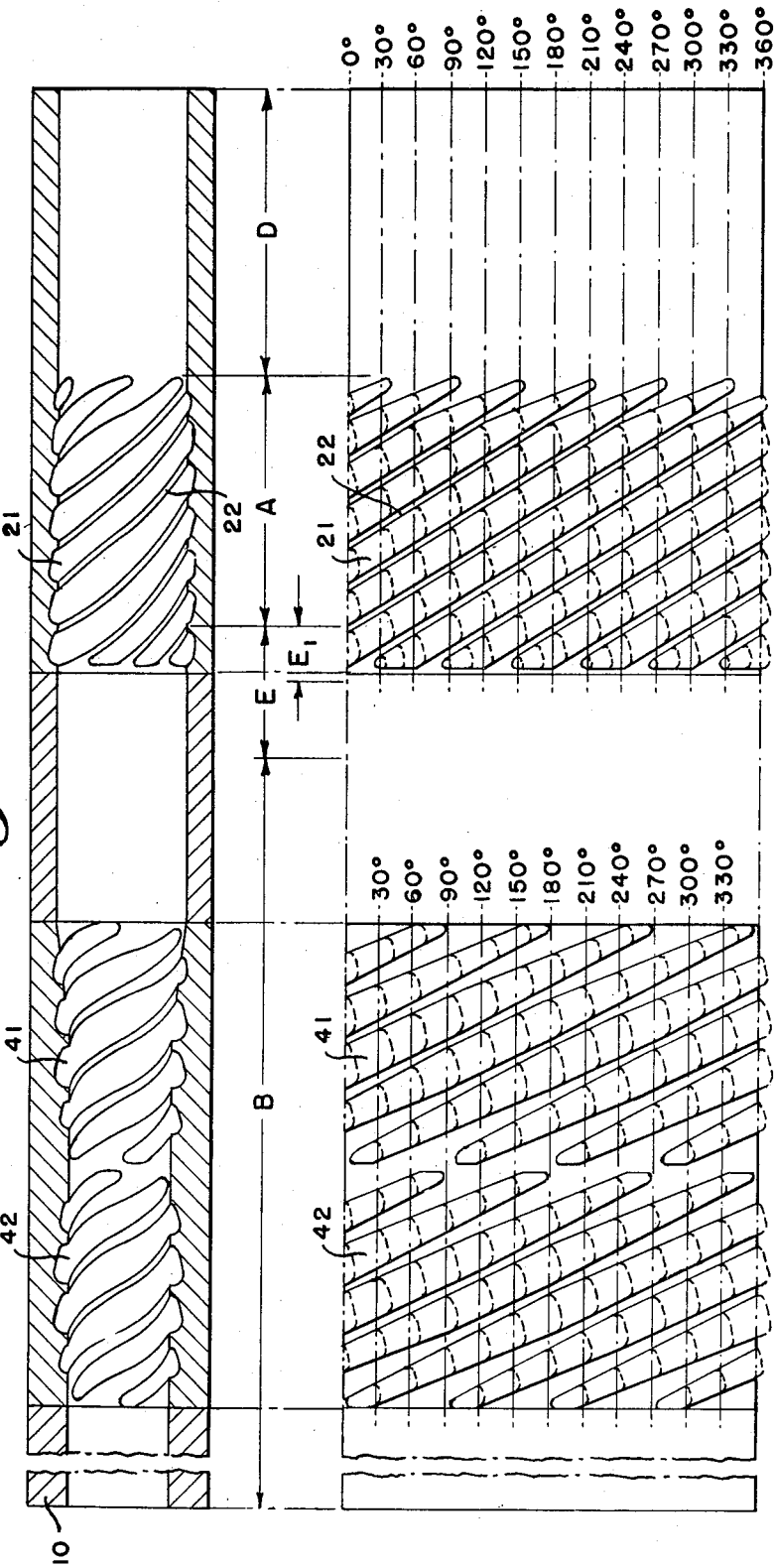

United States Patent Office 3,745,200
Patented July 10, 1973

3,745,200
EXTRUSION METHOD
Paul Geyer, 15660 Tacoma Ave.,
Detroit, Mich. 48205
Original application Jan. 10, 1969, Ser. No. 790,406, now Patent No. 3,632,255. Divided and this application Feb. 18, 1971, Ser. No. 116,501
Int. Cl. B29h 19/00; B28b 3/22
U.S. Cl. 264—37
2 Claims

ABSTRACT OF THE DISCLOSURE

Method and apparatus for the extrusion of thermoplastic materials. First and second worm-type extruders are provided, the first being designed to produce a uniformly extrudable material and having a capacity in excess of that of the second. The uniformly extrudable material discharged from the first extruder enters pressure relief and control means from which it is fed into the second extruder, to the extent of its lesser capacity, at a constant pressure. Excess material discharged from the first extruder passes through an orifice and is returned by feedback means to a preferred position in the feed means for the first extruder. The material fed into the second extruder is discharged therefrom at a uniform volumetric extrusion rate, thereby providing a metering effect, and without significant physical or dimensional variations in the extrudate.

---

This is a division of application Ser. No. 790,406, filed Jan. 10, 1969 now Pat. No. 3,632,255.

DISCLOSURE OF THE INVENTION

This invention relates to an improved method for the extrusion of thermoplastic materials. More particularly, this invention concerns an improved method for the extrusion of natural and synthetic rubber and other elastomeric materials, using improved extrusion apparatus being of the screw or worm type.

Unless otherwise indicated, the terms "extrusion" and "extruder" as used herein refer to and include screw or worm type apparatus used to obtain an extrudate of a particular cross-sectional configuration, as well as such apparatus used for mixing and/or blending of thermoplastic materials.

The volumetric output capacity of an extruder is the maximum rate at which material leaves an extruder at the screw speed at which it is being operated.

Conventional extruders include a barrel, a rotor mounted within the barrel and adapted for rotational movement relative to the barrel, and means for feeding the material to be processed into the extruder, such as a hopper and its associated apparatus, if any. The rotor is provided with one or more threaded portions, and rotational movement of the rotor relative to the barrel forces the material being processed through the barrel and out the discharge end of the extruder. While processed material is being discharged from one end of the extruder, unprocessed material is fed into the feed means at the opposite end of the extruder to thereby make the extrusion process continuous.

Although many of the problems associated with the extrusion of thermoplastic materials have now been solved, one of the problems which has, until now, remained unsolved is that of non-uniform extrusion rate. A non-uniform extrusion rate occurs when the pressure or temperature of the extrudate at the discharge end of the extruder fluctuates, or, in other words, pressure or temperature variations cause the extrudate to be discharged from the extruder at varying rates. Furthermore, this causes a considerable variation in the dimensional characteristics of the extrudate.

There are numerous factors which can, and frequently do, cause pressure or temperature variations at the discharge end of the extruder. Many of these factors have been found susceptible to control, but heretofore it has not been possible to control pressure or temperature variations at the discharge end of the extruder caused by inconsistencies which tend to occur at the feed end of the extruder. These inconsistencies may include or result from an intermittent feed rate, an inability to maintain the rotor full of material at the hopper entrance, or a changing barrel entrance pressure developed by action of the rotor against the incoming material. Moreover, inconsistencies in the character of the incoming material frequently occur. In the extrusion of natural or synthetic rubber stocks, it is frequently found necessary to warm the stock immediately prior to its being fed into the extruder (warm-feed extrusion), whereas it would be much more desirable to feed the stock directly into the extruder (cold-feed extrusion). In fact, attempts at cold-feed extrusion of natural rubber stocks have heretofore been unsuccessful from the standpoint of discharge rate and dimensional uniformity of the extrudate. The apparent reason for the inability, using conventional extruders, to extrude natural and some synthetic rubber stocks is that these stocks have a high degree of elasticity at room temperatures and exhibit a tendency to adhere to and wind around the rotor, when the stock has been stretched to its breaking point, it then breaks releasing its potential energy and thereby causing a pressure surge within the extruder.

The foregoing disadvantages, and others, of conventional extrusion processes are overcome by the method and apparatus of the present invention. In accordance with the invention, a conventional extruder is preceded by a supply extruder which has a volumetric output-rate capacity in excess of that of the conventional extruder. The output from the supply extruder enters pressure relief and control means from which it is fed into the conventional extruder, to the extent of its lesser capacity. The excess material from the supply extruder passes through an orifice located in the pressure relief and control means and is returned through feedback means to a preferred position in the feed means for the supply extruder where it is combined with unprocessed incoming material.

The method of the invention permits the material to be extruded to be introduced into the conventional extruder under reasonably uniform conditions of temperature, pressure, and viscosity. This is the direct result of the action of the supply extruder in masticating, blending, warming, mixing and plasticizing the material to make it uniformly extrudable prior to its introduction into the conventional extruder. The excess volumetric capacity of the supply extruder provides assurance that the grooves in the feed end of the conventional extruder will be completely filled with a uniformly extrudable material. At the same time, the feedback means provides a path for return of the excess stock to the input of the supply extruder and also compensates for pressure and temperature fluctuations which might occur at the discharge end of the supply extruder.

It is therefore an object of the present invention to eliminate variations in the discharge rate, physical characteristics, and dimensional characteristics of an extrudate.

Another object of the invention is to provide a method for eliminating variations in an extrudate caused by variations in pressure, temperature, viscosity, quantity, quality and surface conditions of incoming material at the feed end of a conventional extruder.

A further object is to provide an improved method for the extrusion of thermoplastic materials.

A still further object is to provide an improved method for the extrusion of natural and synthetic rubber and other elastomeric materials, and also for the cold-feed extrusion of such elastomeric materials.

These and other objects of the invention become more apparent and are more readily understood upon further reading of the description and upon reference to the accompanying drawings, in which:

FIG. 1 is a block diagram which illustrates the extrusion method of the invention;

FIG. 2 is a sectional elevational view of extrusion apparatus in accordance with the invention, and is the preferred embodiment of the present invention as applied to the extrusion of natural and synthetic rubber stocks having a high, degree of elasticity;

FIG. 4 is a groove characteristics drawing for the barrel shown in FIG. 2.

Figure 3:
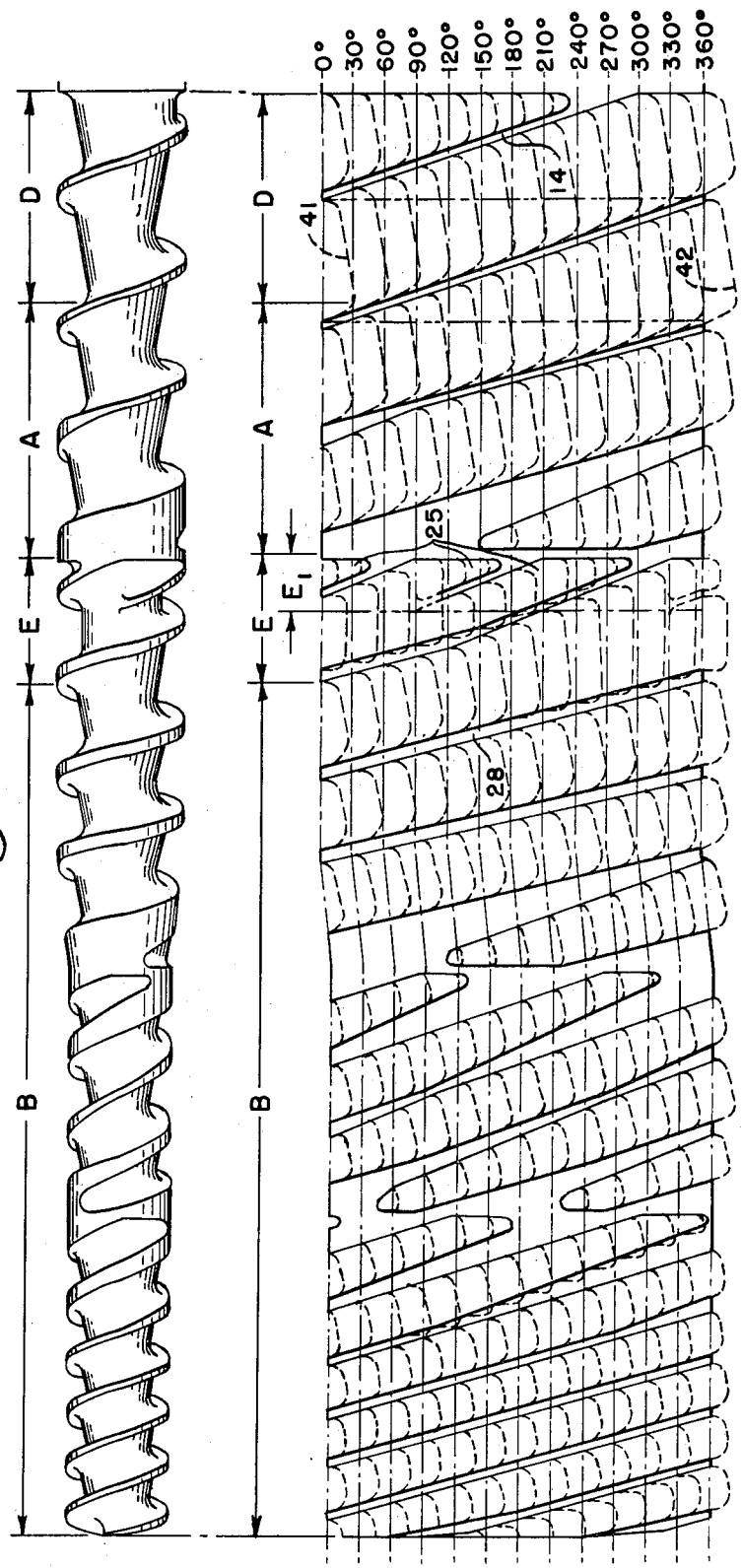
FIG. 3 is a groove characteristics drawing for the rotor shown in FIG. 2, the rotor being shown in FIG. 3 as if it had been cut along its axial length and unrolled to form a grooved, but otherwise flat, surface.

The block diagram in FIG. 1 is generally illustrative of the method of the invention. Unprocessed incoming material enters supply extruder feed means D, which might include a hopper, ram means for forcing the material into the barrel of the supply extruder, and means for allowing the excess material to re-enter the supply extruder. The material to be processed passes through supply extruder feed means D into extruder A. The precise function of supply extruder A is necessarily dependent upon the characteristics of the incoming material. If the incoming material is natural or synthetic rubber or other elastomeric material, supply extruder A may be used to masticate and mix the rubber stock and to warm it to thereby decrease its viscosity and reduce its elasticity, the purpose being to achieve a uniformly extrudable, plastic rubber stock; if the incoming material were to consist of two or more different rubber stocks, the function of supply extruder A would then include blending of such different stocks to obtain a uniformly extrudable, and at least partially blended, material. If the incoming material were to be in the form of powders, pellets, crumb, or the like, supply extruder A would perform the functions of compacting, mixing and warming them, the purpose again being to produce a uniformly extrudable material. The term "uniformly extrudable material" as used above refers to a material which has been mixed, blended, compacted, warmed and plasticized (made flowable) to such an extent as is necessary to make it readily extrudable upon introduction into a conventional extruder. As an aid in achieving such a uniformly extrudable material, supply extruder A may be equipped with such suitable temperature control means, such as circulating water or steam, as are well known and within the skill of the art.

As is shown in FIG. 1, the output from supply extruder A passes through a pressure relief and control region or means E, which need only consist of a suitable orifice in a conduit connecting supply extruder A and conventional extruder B, because supply extruder A is provided with a volumetric output-rate capacity in excess of that of conventional extruder B, the latter lacks sufficient capacity to extrude the entire output from supply extruder A. Therefore, the excess output is forced through the orifice and is conducted by feedback means C back to supply extruder feed means D where it is again fed into supply extruder A. It is usually necessary that the material thus circulated or recirculated be fed into supply extruder A at a point located upstream of the point at which the incoming material is fed into supply extruder A so that the recirculated excess material will be combined with, or drawn into supply extruder A in preference to, the unprocessed incoming material. The portion of the output from supply extruder A which is fed into conventional extruder B enters at a reasonably constant pressure. This results from the fact that fluctuations in the pressure at the discharge end of supply extruder A are compensated for by the tendency of the orifice to relieve and control the pressure in the region in which it is located. Thus, not only is the material which enters conventional extruder B of a uniformly extrudable character, but it also enters at a constant pressure to thereby eliminate variations which would otherwise occur at the feed end of conventional extruder B.

Versatility may be provided for the above described extrusion method and apparatus through the use of separate variable speed drives for the rotors of supply extruder A and conventional extruder B. Moreover, feedback means C may comprise a screw conveyor also having a separate variable speed drive. In addition, the size of the orifice located in pressure relief and control region E may be made adjustable. This permits the pressure on the material entering conventional extruder B to be fixed in accordance with the specific requirements for that material.

Although the apparatus used in the invention may be made very versatile, simplification is possible where a high degree of versatility is unnecessary. To that end, supply extruder A and conventional extruder B may be provided with a common rotor and barrel, the rotor and barrel having separate sections corresponding to the respective extruder portions. Apparatus of this type is shown in FIG. 2.

FIG. 2 is a sectional elevational view of apparatus in accordance with the invention and is the preferred embodiment of the invention as applied to the extrusion of natural and synthetic rubber stocks having a high degree of elasticity, and particularly, as applied to the cold-feed extrusion of such stocks. The extrusion apparatus has a a barrel 10, provided with a variable diameter bore 11 extending therethrough, which acts in combination with a rotor 12 rotatably mounted therein. The rotor 12 is adapted to be rotated by variable speed motor and drive means 13.

Barrel 10 and rotor 12 are both divided into four cooperating sections along their respective lengths, as shown in FIG. 2; the letter designations for these sections correspond to similar designation in FIGS. 1, 3, and 4. Supply extruder feed means D comprises the initial section of rotor 12 having a single lead helical thread 14, an opening 15 in barrel 10, a hopper 16 surrounding opening 15, and stock return inlet 17 also located in barrel 10. Stock return inlet 17 is located as far upstream as is reasonably possible in order to permit returning stock to be trapped by helical thread 14 and fed into supply extruder A in preference to unprocessed incoming material entering through opening 15, the excess material thereby being combined with the unprocessed incoming material.

Stock which enters supply extruder feed means D through stock return inlet 17 and through opening 15 becomes trapped in the groove 20 formed by helical thread 14. Rotation of rotor 12 forces the stock into supply extruder A where it is masticated, mixed, warmed and, in the case of some types of stock, blended to thereby form a uniformly extrudable material. Supply extruder A is preferably designed generally in accordance with the teachings of U.S. Reissue Pat. 26,147. In accordance with the teachings of that patent, supply extruder section A of barrel 10 is provided with six helical grooves 21 (six-lead thread) which start from zero depth at the feed end of supply extruder section A and which gradually increase in depth as they wind around barrel 10, until a maximum depth is reached near the discharge end of supply extruder section A. Helical grooves 21 extend a slight distance into the pressure relief and control region E of barrel 10, and in this slight distance the depth of helical grooves 21 decreases abruptly from their maximum depth to zero.

As helical grooves 21 in supply extruder A gradually increase in depth, helical groove 20 decreases in depth. Thus, stock moving downstream through supply extruder A is forced out of helical groove 20 in rotor 12 and is forced into helical grooves 21 in barrel 10. During the course of its transfer from rotor 12 to barrel 10, the stock passes through a plane of maximum shear stress, this plane being located at approximately the crest of threads 14 and 22. As the stock passes through the plane of maximum shear stress, it is stressed beyond its shear strength and as a result is masticated. At the same time, the stock absorbs energy which increases its temperature and decreases its viscosity to render it plastic and flowable to such degree that it can be described as being uniformly extrudable. It should be noted that the depth of helical groove 20 decrease to zero at the discharge end 23 of supply extruder A. Thus, all of the stock discharged from supply extruder A must of necessity have been transferred from helical groove 20 of rotor 12, through the plane of maximum shear stress, and into helical grooves 21 of barrel 10, the latter grooves providing a path for discharge of the stock from supply extruder A directly into pressure relief and control region or means E.

Pressure relief and control region E of rotor 12 has an initial portion $E_1$ containing three helical start grooves 25 (triple-lead thread) which rapidly increase from zero depth to a maximum depth. At the downstream end of portion $E_1$ the three start grooves merge into a single helical groove 26. Stock discharged from helical grooves 21 of supply extruder A is forced once again through a plane of maximum shear stress and into the three start grooves 25, any small lumps of stock which might remain being thereby masticated.

The volumetric output-rate capacity of supply extruder A is in excess of that of conventional extruder B. Because this is true, helical groove 26 becomes completely filled with uniformly extrudable stock discharged from supply extruder A. Only a portion of the stock which enters helical groove 26 is carried through conventional extruder B, this portion being determined by its lesser volumetric output-rate capacity. The balance of the stock, i.e., the excess, passes through an orifice 27 located in pressure relief and control region E. Stock passing through orifice 27 is returned by feedback means hereinafter described to supply extruder feed means D.

Orifice 27 controls the pressure in the stock entering conventional extruder B and prevents large pressure variations by providing a pressure relief path for the excess stock. In this connection, orifice 27 performs the function of a pressure relief valve and at the same time its action is similar to that of a tank overflow. Moreover, orifice 27 controls the overall pressure level of the stock in helical groove 26 in that the size of the orifice is determinative, within limits, of the level to which the pressure can rise; more specifically, the pressure level increases as the size of the orifice decreases and as its length increases. Although the pressure in the stock in helical groove 26 is otherwise constant, the pressure in the immediate vicinity of orifice 27 tends to peak each time rotor thread 28 passes the orifice. This is merely a local disturbance which results in the excess stock being discharged through orifice 27 in a pulsating manner. The stock which is forced into the feed end of conventional extruder B by rotor thread 28 is a uniformly extrudable material at a constant pressure.

From the above, it becomes apparent that pressure relief and control means E is essentially comprised of a conduit (in this case, helical groove 26) connecting the discharge end of the supply extruder to the feed end of the conventional extruder. The conduit contains an orifice through which the excess stock passes and which determines the pressure level of the stock entering the feed end of the conventional extruder. As is shown in FIG. 2, the conduit may actually be a more or less integral part of the supply extruder and the conventional extruder.

In order to provide flexibility in the extrusion apparatus, it is desirable that orifice 27 be adjustable. To that end, orifice 27 is an opening in removable and replaceable member 30. Preferably, orfice 27 has conical inlet and outlet portions to provide a smooth flow of stock therethrough. As an alternative to the design shown in FIG. 2, member 30 may comprise an adjustable iris.

The excess stock passing through orifice 27 is conducted through pipe 31 into feedback means C which may comprise a screw conveyor 34 having a barrel 35, a rotor 36, and motor drive means 37. Feedback means C conveys the excess stock into return pipe 39 and thence through return inlet 17 of supply extruder feed means D. As an alternative to the preferred embodiment, feedback means C may comprise guide means having a series of bearings or rotating members to carry and guide the excess stock, or other suitable means for returning and guiding the excess stock back to supply extruder feed means D may be used.

In the preferred embodiment shown in FIG. 2 for the cold-feed extrusion of natural and synthetic rubber having a high degree of elasticity, conventional extruder B is also designed in accordance with the teachings of U.S. Reissue Pat. 26,147. Thus, although other designs could be used, conventional extruder B is provided with a series of helical grooves 41 and 42 in barrel 10, and stock fed into this extruder is transferred from rotor 12 into barrel 10 and then back into rotor 12, and so forth, to thereby cause the stock a number of times to pass through planes of maximum shear stress. Finally, the stock is discharged from conventional extruder B at a uniform volumetric output rate.

The difference in volumetric output rate capacity between supply extruder A and conventional extruder B determines the amount of excess stock recirculated through feedback means C. For uniform extrusion it is generally sufficient for supply extruder A to be designed with a volumetric output-rate capacity ten percent in excess of that of conventional extruder B. However, if stock blending is required, or if increased temperature is desired, the capacity of supply extruder A can be increased to as much as two or three times that of conventional extruder B. Of course, variable conditions in supply extruder A will cause some variation in its volumetric output rate.

With reference now to FIG. 3, there is shown a view of rotor 12 and a groove characteristics drawing therefor. The groove characteristics drawing shows rotor 12 as if it had been cut along its axial length to form a grooved, but otherwise flat, surface; thus, the groove characteristics drawing looks much like a paper cylinder with helical lines on it would look if it were cut along its axial length and laid flat. The groove characteristics drawing permits the entire 360 degrees of rotor 12 to be seen. Profile sections of the grooves are shown for every 30 degrees, as is indicated at the right of the drawing. It should be noted, for purposes of illustration, that the groove profile at zero degrees is identical and vertically in line with the profile at 360 degrees; thus, for example, groove profile 41 is in fact groove profile 42.

The groove characteristics drawing is advantageous in that it shows the manner in which the grooves begin or terminate or merge with one another. Thus, for example, the manner in which helical start grooves 25 originate and merge to form a single groove is readily apparent from FIG 3.

FIG. 4 is similar to FIG. 3, except that it depicts the groove characteristics of barrel 10. Both FIG. 3 and FIG. 4 are primarily intended to illustrate detail of rotor 12 and barrel 10 that cannot be seen in FIG. 2. It is believed that the full implications of FIGS. 3 and 4, when viewed in light of the foregoing description, will be apparent to one skilled in the art.

It is to be understood that the above description and accompanying drawings are for the purpose of illustration, not limitation, and changes and modifications may be made therein without departing from the spirit and scope of the invention.

Having thus described the invention, what is claimed and desired to be protected by Letters Patent is:

1. A method for the extrusion of thermoplastic materials comprising the steps of:
    (a) introducing material to be extruded into a first extruder at a first entry point;
    (b) operating said extruder and operating a second extruder, said first extruder being operated to cause the thermoplastic material therein to be discharged therefrom in uniformly extrudable condition and at a volumetric output rate in excess of the volumetric output rate capacity of said second extruder;
    (c) dividing the uniformly extrudable material obtained from said first extruder, in a conduit connecting the discharge end of the first extruder to the feed end of the second extruder, into a first stream having a volumetric rate equal to the volumetric output rate capacity of the second extruder and a second stream consisting of the remaining portion of said material and thus determining the pressure level of stock entering the feed end of the second extruder; and
    (d) feeding said first stream of uniformly extrudable material into said second extruder;
    (e) passing said second stream of uniformly extrudable material through an orifice in said conduit and returning said second stream of material to said first extruder at a second entry point which is located upstream of said first entry point and feeding said second stream of material into said second entry point;
    whereby the material is discharged from said second extruder at a constant volumetric output rate.

2. The method of claim 1 wherein the step of returning said second stream of uniformly extrudable material includes feeding the second stream of material into a screw conveyor and operating the conveyor to return the second stream of material to the input of said first extruder.

References Cited
UNITED STATES PATENTS

| | | | |
|---|---|---|---|
| 3,459,840 | 8/1969 | Wood | 264—37 |
| 2,871,516 | 2/1959 | Sherman et al. | 264—176 R |
| 3,090,994 | 5/1963 | Stenger | 18—30 FR |

ROBERT F. WHITE, Primary Examiner

G. AUVILLE, Assistant Examiner

U.S. Cl. X.R.

264—176 R, 329, 349; 425—205, 376

PO-1050
(5/69)

UNITED STATES PATENT OFFICE
CERTIFICATE OF CORRECTION

Patent No. 3,745,200     Dated January 4, 1974

Inventor(s)    PAUL GEYER

It is certified that error appears in the above-identified patent and that said Letters Patent are hereby corrected as shown below:

Column 1, line 4, after the number "48205" the following should appear --assigned to Uniroyal, Inc.--.

Signed and sealed this 16th day of April 1974.

(SEAL)
Attest:

EDWARD M. FLETCHER, JR.
Attesting Officer

C. MARSHALL DANN
Commissioner of Patents